(No Model.)
E. B. BEHEL & F. C. JENKINS.
GRAIN HEADER.
No. 509,648. Patented Nov. 28, 1893.
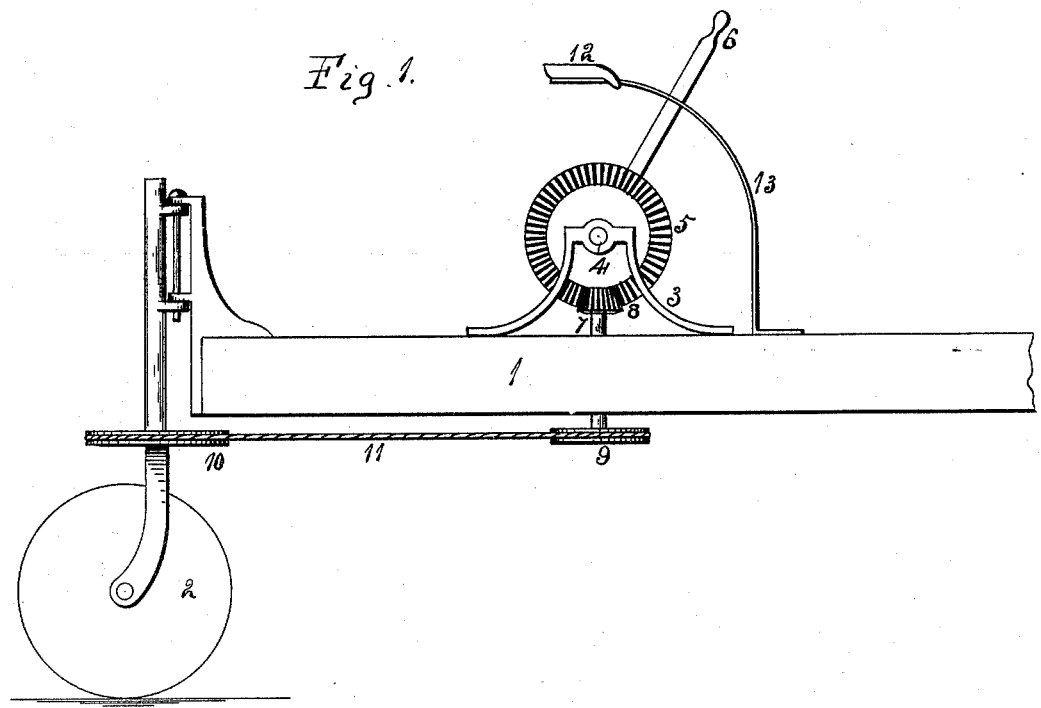
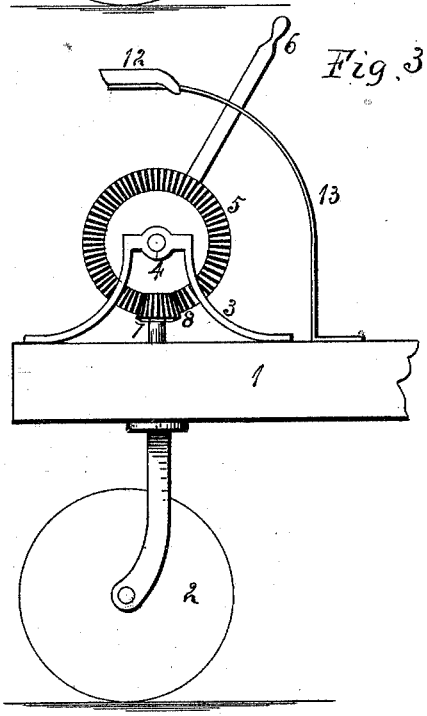
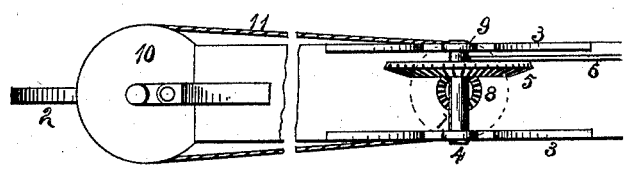

UNITED STATES PATENT OFFICE.

EDMUND B. BEHEL AND FREEMAN C. JENKINS, OF CUNNINGHAM, KANSAS.

GRAIN-HEADER.

SPECIFICATION forming part of Letters Patent No. 509,648, dated November 28, 1893.

Application filed June 26, 1893. Serial No. 478,881. (No model.)

*To all whom it may concern:*

Be it known that we, EDMUND B. BEHEL and FREEMAN C. JENKINS, citizens of the United States, residing at Cunningham, in the county of Kingman and State of Kansas, have invented certain new and useful Improvements in Grain-Headers, of which the following is a specification.

The object of this invention is to construct a hand lever connection with the steer wheel of a heading machine.

In the accompanying drawings, Figure 1, is a side elevation of the tongue portion of a header embodying the features of our invention. Fig. 2, is a plan view of our improvements shown at Fig. 1. Fig. 3, shows a modification of the same.

In the construction of headers the caster wheel or steer wheel has been manipulated by the operator straddling a lever, and by the movement of the legs the lever was turned and held between the legs at all times during the running of the header. This construction necessitates the operator standing. By our improvements the operator can remain seated and change the position of the caster wheel.

The tongue 1, has a caster wheel 2, pivotally connected to the end thereof. To the upper face of the tongue forward of the caster wheel are secured two brackets 3, supporting a transverse shaft 4, upon which is mounted a beveled gear wheel 5, to the rear face of which is secured a hand lever 6. A shaft 7, extends vertically through the tongue having a beveled pinion 8, secured to its upper end and a grooved pulley 9, to its lower end. Around the shank of the caster wheel is secured a grooved faced wheel 10. A flexible cable 11, is passed around the wheel 9, its ends being connected to the wheel 10. A seat 12, is supported upon a spring 13, in close proximity to the hand lever. By this arrangement the operator can turn the caster wheel in the required direction by means of the hand lever, and it will remain in such position until changed by the operator, without necessitating the operator standing.

At Fig. 3, the bevel pinion 8, is connected direct to the caster wheel shank, which in some makes of machines may be preferable.

It is evident that sprocket wheels and drive chains may be employed in place of the wheels and cables.

We claim as our invention—

1. In a grain header, the combination of a tongue, brackets secured to the upper face thereof, a gear wheel supported by the brackets, a hand lever having a connection with the gear wheel a vertical shaft supporting a pinion meshing with the gear wheel, a steer wheel and a connection between the shaft and steer wheel.

2. In a grain header, the combination of a tongue, brackets secured to the upper face thereof, a gear wheel supported by the brackets, a hand lever having a connection with the gear wheel a vertical shaft supporting a pinion meshing with the gear wheel, a steer wheel, a grooved faced wheel supported by the steer wheel shaft, a grooved faced wheel supported by the vertical shaft, and a flexible connection between the wheels.

EDMUND B. BEHEL.
FREEMAN C. JENKINS.

Witnesses:
J. B. GRIDER,
G. R. SHELTON.